A. F. CAREW.
TOOL AND TOOL HOLDER.
APPLICATION FILED NOV. 30, 1915.
1,239,459. Patented Sept. 11, 1917.
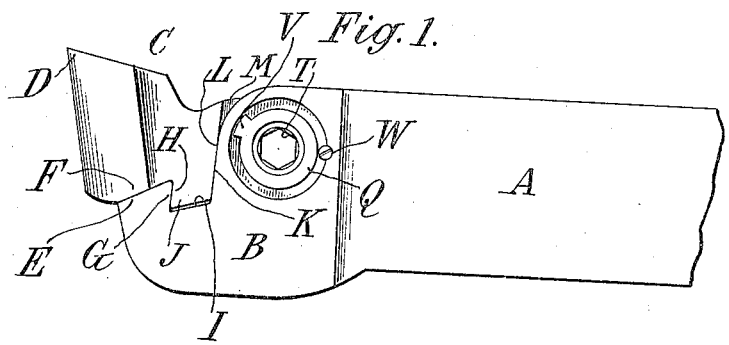
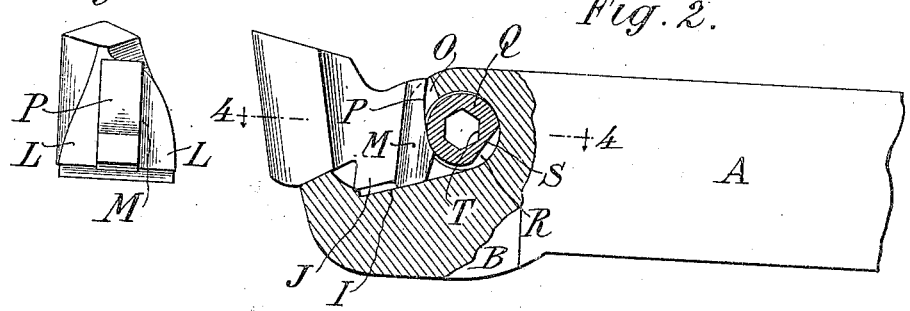
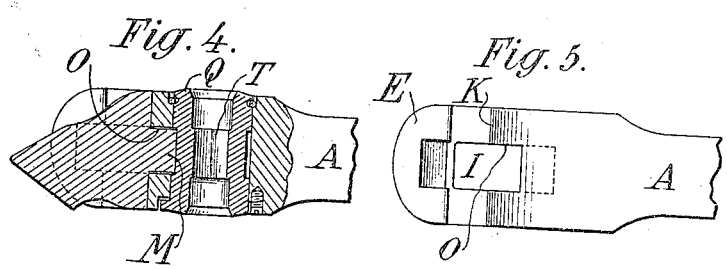
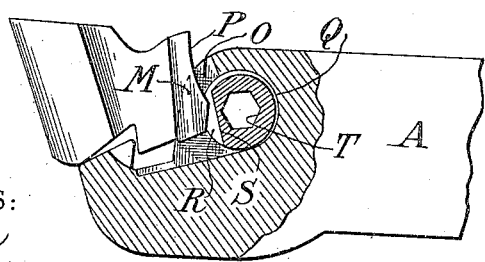
WITNESSES:
René Pruine
Fred White
INVENTOR:
Andrew F. Carew,
By Attorneys,
Fraser, Turk & Miller

UNITED STATES PATENT OFFICE.

ANDREW F. CAREW, OF CONEY ISLAND, NEW YORK, ASSIGNOR TO J. H. WILLIAMS & CO., OF BROOKLYN, NEW YORK, A CORPORATION OF NEW YORK.

TOOL AND TOOL-HOLDER.

1,239,459.

Specification of Letters Patent. Patented Sept. 11, 1917.

Application filed November 30, 1915. Serial No. 64,314.

*To all whom it may concern:*

Be it known that I, ANDREW F. CAREW, a citizen of the United States of America, residing in Coney Island, in the county of Kings and State of New York, have invented certain new and useful Improvements in Tools and Tool-Holders, of which the following is a specification.

This invention relates to machine tools, and aims to provide certain improvements therein.

The invention is particularly directed to a holder and tool designed for use on lathes, planers, shapers and other metal working machines, and particularly where heavy duty is required of the tool and holder.

The invention provides a holder and separable tool, the parts being so constructed that the tool is locked rigidly in the holder against the various stresses which occur in use, and preferably the setting means is a part which may be easily and quickly operated to lock and release the tool. The invention will be more fully described with reference to the accompanying drawing, wherein,—

Figure 1 is a side elevation of the tool and holder;

Fig. 2 is a side elevation of the tool with the holder shown in longitudinal vertical section;

Fig. 3 is a rear view of the tool;

Fig. 4 is a sectional view of the tool and holder on the line 4—4 of Fig. 2.

Fig. 5 is a plan view of the front end of the holder.

Fig. 6 is a view similar to Fig. 2, showing the tool in the act of being adjusted in place in the holder.

Referring to the drawings, let A indicate the shank of a holder and B its head. C is the tool having a cutting face D of any suitable design.

The head B of the tool holder is provided with an abutment E upon which a portion F of the tool rests in use. This abutment may extend at various angles with regard to the longitudinal axis of the tool, but the angle chosen will be such that when the strain of the work is on the tool, the face E will lie at substantially right angles to the line of thrust, so that the strain is transmitted directly to the tool holder head. As shown in Fig. 5 the abutment E preferably extends entirely across the head of the tool holder, so that a broad seating face is provided and any rocking of the tool is prevented. At the rear of the face E the head B is formed with a face G, and the tool is formed with a corresponding face H. These faces extend in a substantially vertical direction, transversely of the tool, and meeting the faces E and F form an angle therewith which is preferably slightly acute or wedge-shaped, as best shown in Figs. 1 and 2. Preferably the head B is formed with a recess I designed to receive a bottom projection J formed on the tool. In this case the face G just referred to constitutes the front wall of the recess while the face H constitutes the front wall of the projection J. Back of the recess I the tool head is preferably formed with a more or less vertical face K, while the tool is constructed with a similar face L. The recess I and faces K and L also preferably extend substantially across the tool head. At the rear of the tool I preferably provide a tongue M (see Figs. 2, 3 and 4) which enters a vertical slot or groove O formed in the head of the tool, and the rear of the tongue is constructed with a bearing face P adapted to be engaged by the locking member. The locking member is shown as a rotary cam Q extending transversely of the tool, and in this case the bearing face P is preferably slightly curved where it comes in contact with the cam as the latter is tightened (see Fig. 2).

As shown, the cam Q works in a circular recess R (Fig. 6) which recess joins the groove O so that a section of the cam is free to engage the tongue. Preferably the cam is formed with a flat portion S which facilitates the insertion and removal of the tool as illustrated in Fig. 6. The cam Q is provided with some means whereby it may be rotated, such as the internal wrench faces T.

It will be observed that when the tool is clamped in place, as shown in Fig. 2, by the rotation of the cam Q, the tool is forced forwardly (and in the construction shown slightly downwardly) until the faces G and H are in close contact, which draws down the faces E and F into similar contact, thus rigidly clamping the tool against forward or backward movement. Such faces, however, do not prevent sidewise movement of the tool in the holder, and as the cutting strains in most cases exert a lateral thrust on the tool the latter would move sidewise were it not for the tongue M engaging the walls of its recess O, which absolutely prevents such lateral movement. By this means the tool is held most rigidly in place without the exercise of great force in rotating the cam, and the strains of use are transmitted directly to the wall of the holder.

It is desirable that a stop be employed for limiting the movement of the cam in one direction so that it will stop when the flat surface S is in favorable position for the insertion or removal of the tool. One form of stop is illustrated in Fig. 1, wherein the cam is provided with a stop member V designed to contact with a screw pin W when the parts are in the position of Fig. 6.

It is obvious that various changes may be made in the construction herein shown and described without departing from the invention. Thus, for instance, other means may be employed for preventing lateral movement of the tool than the tongue and groove connection described. Furthermore, the shape of the tongue may be varied and the shape and position of the several contacting faces. Also other locking means may be employed if desired.

What I claim is:—

1. The combination of a tool holder and a tool, the parts having means for preventing forward movements of the tool, and a tongue and groove connection formed back of said means and between the rear of the tool and the tool holder for preventing lateral movement of the tool.

2. The combination of a tool holder and tool, the tool holder having a rearwardly facing abutment and the tool having a forwardly facing abutment, and a rotatable cam contacting directly with the rear face of the tool.

3. The combination of a tool holder and tool, the tool holder having a rearwardly facing abutment and the tool having a forwardly facing abutment, and a separate tongue and groove connection between the tool holder and tool for preventing lateral movement of the tool.

4. The combination of a tool holder and a tool, the tool holder having an abutment adapted to prevent downward movement of the tool, and the tool holder having a face seating on said abutment, and said tool holder having a rearwardly facing abutment, and the tool having a forwardly facing abutment contacting therewith, and a tongue and groove connection between the tool holder and the rear of the tool for preventing lateral displacement of the tool.

5. The combination of a tool holder and a tool, the tool holder having an abutment adapted to prevent downward movement of the tool, and the tool holder having a face seating on said abutment, and said tool holder having a rearwardly facing abutment, and the tool having a forwardly facing abutment contacting therewith, a tongue and groove connection between the tool holder and the rear of the tool for preventing lateral displacement of the tool, and a cam member bearing against the rear of said tool.

6. The combination of a tool holder and a tool, the tool holder having an abutment adapted to prevent downward movement of the tool, and the tool holder having a face seating on said abutment, and said tool holder having a rearwardly facing abutment, and the tool having a forwardly facing abutment contacting therewith, a tongue on said tool and a groove in said tool holder, adapted to receive said tongue, said tongue and groove being independent of said rearwardly facing abutment.

7. A tool holder having an abutment adapted to prevent downward movement of the tool, a rearwardly facing abutment adapted to prevent forward movement of the tool, a groove back of said last-named abutment adapted to receive a part of the tool, and means adapted to bear against said part of the tool for tightening the tool in the holder.

8. A tool holder having an abutment adapted to prevent downward movement of the tool, a rearwardly facing abutment adapted to prevent forward movement of the tool, a groove back of said last-named abutment adapted to receive a part of the tool, and means adapted to bear against said part of the tool for tightening the tool in the holder, and a rotary cam at the rear of said groove adapted to bear against the part of the tool which enters said groove.

9. The combination of a tool holder and tool, the tool holder having an abutment adapted to prevent downward movement of the tool, and a rearwardly facing abutment adapted to prevent forward movement of the tool, and a circular cam adapted to bear against the rear of the tool, said cam having a flat portion adapted to permit passage of the tool into place, and a cam portion adapted to bear against the tool after the latter is in place.

10. The combination of a tool holder and a tool, the parts having means for preventing forward thrust of the tool and means for preventing lateral thrust of the tool, said means being separated and one located toward the front of the tool and the other located at the rear of the tool, one comprising a rearwardly facing abutment on the holder and a coacting face on the tool, and the other comprising a tongue on one part and a groove on the other part.

In witness whereof, I have hereunto signed my name in the presence of two subscribing witnesses.

ANDREW F. CAREW.

Witnesses:
CHARLES B. HARRIS,
ARTHUR H. WENDELCKE.